Nov. 19, 1935.  R. F. PEO  2,021,428
HYDRAULIC SHOCK ABSORBER
Original Filed Feb. 7, 1931
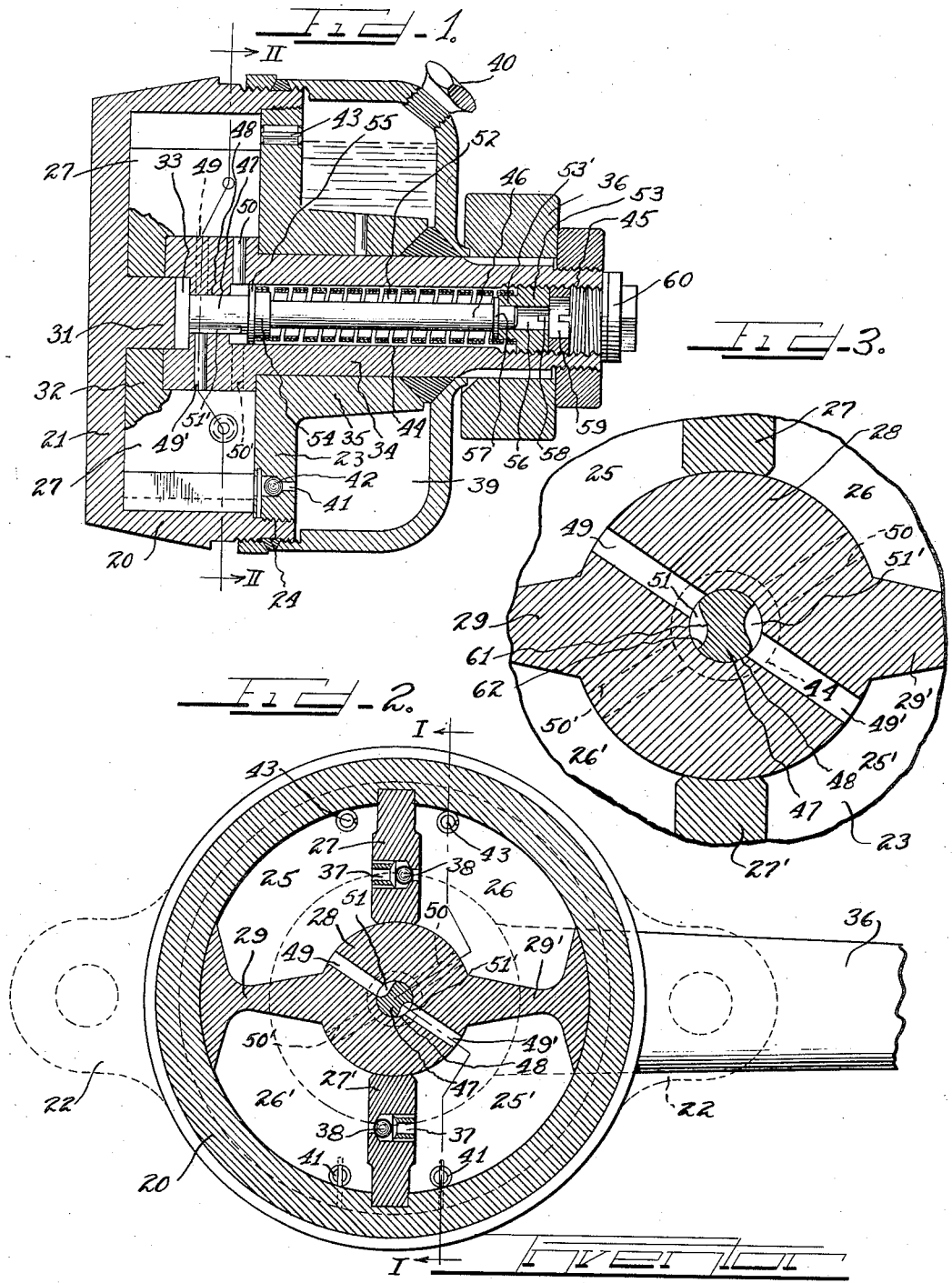
Inventor
Ralph F. Peo
by Charles D. Wills Attys Patented Nov. 19, 1935

2,021,428

UNITED STATES PATENT OFFICE 2,021,428

HYDRAULIC SHOCK ABSORBER

Ralph F. Peo, Buffalo, N. Y., assignor to Houde Engineering Corporation, Buffalo, N. Y., a corporation of New York Original application February 7, 1931, Serial No. 514,094. Divided and this application December 5, 1932, Serial No. 645,725

27 Claims. (Cl. 188—89)

This invention relates to a hydraulic shock absorber which includes among other elements a working chamber containing a resistance liquid and a piston movable back and forth in said chamber, the piston and the body containing the working chamber being connected to the relatively movable members between which the shock is to be absorbed, such as the body and axle of an automobile.

This application is a divisional application to cover subject matter fully disclosed in my pending application Serial No. 514,094, filed February 7, 1931.

The invention concerns particularly improved valve structure for controlling the bypassage of resistance fluid from one side of the piston to the other, and the main object is to provide a valve structure operable automatically to adjust the bypassage in accordance with temperature changes and to increase the flow resistance through the bypassage proportionately to the increase of the velocity of the fluid flow through said bypassage in order that the action of the shock absorber may be such that its resistance will be more nearly proportionate to temperature changes of the resistance fluid and to the severity of road conditions and with the shock absorber resistance built up steadily from a boulevard ride to a high-speed ride over rough roads and without sudden breaks or discontinuances in the action of the shock absorber and with the resistance at all times proportionate to the speed of operation.

The invention also includes features of construction and arrangement which will enable the valve, preferably of the rotary type, to respond freely and accurately to temperature and velocity changes in order to effect the desired adjustment for efficient operation of the shock absorber.

The various features of my invention are incorporated in the structure disclosed on the drawing, in which drawing:

Figure 1 is a vertical longitudinal section of a well-known type of shock absorber, the section being taken on line 1—1, Figure 2;

Figure 2 is a vertical transverse section taken on line 2—2, Figure 1; and

Figure 3 is a section similar to Figure 2 showing the valve in another position.

The body of the shock absorber shown comprises a cylindrical wall 20 which is closed at its rear end by a fixed head 21 which is adapted to be secured to one of the relatively movable members between which the shock is to be absorbed, for instance, the body or frame of an automobile. Fastening of this body to the automobile frame is preferably effected by means of attaching lugs 22 which are arranged on opposite sides of the body and connected with the frame by means of bolts passing through the lugs 22. To the front end of the cylindrical wall 20 is secured a front head 23 by means of a screw joint 24 or otherwise, thereby forming with the wall 20 and the rear head 21 a cylindrical space which contains the means whereby the shock absorbing liquid is subjected to pressure for absorbing the shock.

Projecting radially into this cylindrical space are the upper and lower partition sections 27 and 27' which are connected at their outer ends with the wall 20 while their inner ends are separated and receive between them the hub 28 from which extend radially in opposite directions the two pistons or vanes 29 and 29'. The rear head 21 is provided with a forwardly projecting centering or pilot pin 31 which passes through a centering ring 32 connecting the rear edges of the partition sections 27 and 27' and projecting into a recess 33 at the inner end of the hub 28 so that this pin serves as a rear bearing for the hub of the piston. At its outer end the hub 28 is connected with the inner end of an operating shaft 34 which is journalled in a bearing 35 projecting forwardly from the central part of the front wall 23. At its outer end, this shaft has secured thereto the hub of an operating arm or lock lever 36 which is connected with a part movable relatively to the body of the automobile, preferably the axle which is connected with the body or frame by means of a spring system that carries the supporting wheels.

The partitions 27 and 27' and the pistons 29 and 29' divide the cylindrical space within the walls 20, 21 and 23 into diametrically opposite high pressure chambers 25 and 25' and diametrically opposite low pressure chambers 26 and 26', these chambers containing the resistance fluid to be displaced by the pistons when oscillated with the shaft 34 during running of a vehicle. Each of the partitions 27 and 27' has a passageway 37 therethrough controlled by a check valve 38 shown in the form of a ball. The arrangement is such that fluid may readily flow from the low pressure chambers into the high pressure chambers through these passageways but return flow will be checked and prevented by the ball valve, the free flow of the fluid through these passageways occurring when the body of the automobile and the axles thereof move toward each other, and the return flow of the fluid being checked when the automobile body and the axles move away from each other. The resistance fluid is automatically supplied to the working chambers as required from a replenishing chamber 39 which is arranged in front of the working chambers and is adapted to be filled as required through an opening in its top which is normally closed by a plug 40.

Delivery of the resistance fluid from this replenishing chamber into the working chambers may be effected by means of one or more replenishing ports 41 connecting either one or both of the lower working chambers with the lower part of the replenishing chamber, and each of these ports contains a check valve 42 which closes toward the replenishing chamber and opens toward the respective working chamber. Any air contained in the liquid is permitted to escape from the upper ends of the working chambers into the upper part of the replenishing chamber through vents 43 extending through the upper part of the front head 23 from the upper part of the replenishing chamber.

The hub shaft 34 has the axial cylindrical bore 44 therethrough having the internal threading 45 at its outer end, and in this bore is the valve stem 46 terminating at its inner end in a cylindrical valve plug 47 which fits and bears in the cylindrical passageway 48 extending axially through the piston hub 28, this passageway being shown as of less diameter than that of the shaft bore or valve chamber 44, and the inner end of the passageway 48 communicates with the recess 33 between the hub and the centering lug 31.

Extending radially through the hub 28 are the passageways or ports 49 and 49' which connect the high pressure chambers 25 and 25' respectively with the passageway 48, and other radially extending ports 50 and 50' extending through the hub connect the low pressure chambers 26 and 26' respectively with the inner end of the valve chamber or bore 44. The cylindrical valve 47 has longitudinally extending channels or ports 51 and 51' which communicate at their outer ends with the valve chamber 44 and at their other ends will register more or less with the ports 49 and 49' respectively depending upon the rotational adjustment of the valve. These valve ports therefore determine the rate of flow of the resistance fluid between the high pressure and low pressure working chambers in addition to the adjustment of the flow control between the chambers by the check valve 38. During low pressure stroke of the piston, the fluid is free to flow through the passages 37 and through the ports in the hub 28 under control of the valve 47, but during high pressure strokes, when the valves 38 close the passageways 37, the flow of fluid from the high pressure chambers to the low pressure chambers can be only by way of the hub ports and under control of the valve ports.

Means are provided for automatically effecting adjustment of the valves in accordance with changes in the temperature and viscosity of the resistance fluid so that the flow of the fluid will be restricted to a greater extent when it is thinned during warm temperature conditions and is permitted to flow more freely when it is thicker during lower temperature conditions in order that the proper resistance of the shock absorber shall not be interfered with or upset by temperature variations. The element for effecting adjustment of the valve in response to temperature changes is shown in the form of a thermostat coil or helix 52 within the valve chamber 44 and surrounding the valve stem 46. This thermostat element is composed of bimetal, for example, two metals having different rates of expansibility such as an outer layer or strip of bronze or brass and an inner layer or strip of ordinary iron or invar iron, these two strips being rigidly secured together and wound to form the helical thermostat element. At its outer end, the thermostat coil receives and is secured to the neck 53' of a supporting head 53 having threaded engagement with the threading 45 at the outer end of the shaft bore 44, and at its inner end the thermostat coil receives and is secured to the hub 54 on the valve stem adjacent to the valve plug 47. Between the hub 54 and the valve plug is the collar or flange 55 which engages the sides of the bore 44 and serves to assist in properly aligning the valve plug in the passageway or seat 48. At its outer end the valve stem journals in the axial bore 56 of the supporting head 53 and the stem has the annular shoulder 57 abutting the inner end of the supporting head 53. In its outer end the supporting head 53 has slots 58 whereby it may be turned manually as by means of a screw driver for manual adjustment of the valve plug and its port relative to the passageway through the hub 28, turning of the head 53 being communicated to the valve plug by the thermostat coil. An annular lock nut 59 may be provided for locking the head 53 after manual adjustment thereof, and in the end of the shaft bore a closure plug 60 may be provided for protecting the mechanism within the shaft bore or chamber 44.

The outer end of the thermostat coil, after manual setting of the head 53, is fixed and as the temperature changes the coil will unwind or contract which movement is transmitted to the valve structure which will be rotated for adjustment of the ports 51 and 51' relative to the ports 49 and 49' through the piston hub. The operation is such that as the temperature of the resistance fluid increases and the fluid becomes less viscous, the thermostat coil will rotate the valve structure to decrease the area of registration of the valve ports with the piston hub ports, and to increase the area of registration as the temperature decreases and the viscosity increases. By such automatic adjustment of the valve in response to temperature changes the proper and efficient functioning of the shock absorber will not be interfered with.

Ordinarily, the travel of vehicles such as automobiles is in greater part over the ordinary roadways of more or less boulevard smoothness and therefore the manual setting of the valve of the shock absorber is usually for efficient operation of the shock absorber under such conditions. Such setting however is not always best for efficient operation of the shock absorber for easy travel of the vehicle over rougher roads and at high speeds, and the rebound action of the vehicle may be too great for comfortable riding. It is therefore desirable that under such severe driving conditions greater resistance be interposed to the bypassage of the fluid in the shock absorber so that the shock absorber may more efficiently oppose the rebound force and absorb the energy thereof. The increased opposition to fluid flow in the shock absorber should be built up in proportion to the increasing rebound energy and fluid velocity in order that the shock absorber resistance may be proportionate to the severity of the road conditions and build up steadily from boulevard ride to high speed ride over the rough roads. Means are therefore provided for the automatic adjustment of the valve 47 by the fluid pressure so that the valve will be rotated toward its closing position to increase the bypassage flow resistance in accordance with the increasing velocity or impact pressure of the fluid so that the shock absorber will thus entirely automatically adjust itself to meet the various road conditions.

To adapt the valve 47 to respond to fluid pressure and impact the channels or ports 51 and 51' therein are of a shape to present vane surfaces against which the fluid forced from the high pressure chambers through the ports 49 and 49' impinges and abruptly changes its direction to flow longitudinally through the valve channels for escape through the ports 50 and 50' to the low pressure chambers. As shown on the drawing the bottom 61 of each of the valve channels inclines inwardly from the outer face of the valve and gradually curves into the end wall 62 of the channel which end wall extends substantially radially. These walls 61 and 62 form the vane surfaces against which the fluid impinges. On Figure 2 the valve channels are fully opened to the ports 49 and 49'. This may be the position of the valve during travel of a vehicle over ordinary boulevard roads. When more severe conditions are encountered and the piston structure is moved more rapidly and violently, and the impact force of the fluid increases as it endeavors to flow more rapidly through the valve controlled ports, the impact of the fluid against the vane surfaces 61 and 62 and the sudden abrupt change in direction of the fluid from radial to horizontal will set up a pressure against the vane surfaces to cause rotation of the valve toward closing position. When the valve channels are shaped to present the more or less radially extending end walls 62 the turning pressure against the valve will be considerably greater.

Yielding elastic means are provided for resisting the closure movement of the valve by the fluid impact and such resisting means may be the thermostat helix 52. This thermostat element will then have two functions. It automatically rotates and sets the valve to gauge the fluid bypassage between the high and low pressure chambers to provide the same hydraulic resistance at a definite rate of flow during temperature change, and it serves as a spring for resisting and cooperating with the impact pressure against the valve for closure movement of the valve in proportion to the fluid velocity. As shown on the drawing, Figures 2 and 3, the valve turns in counterclockwise direction for closing the bypassageway, Figure 2 showing the valve channels substantially fully exposed to the high pressure ports, while Figure 3 shows the ports partially closed, the valve having been turned by the fluid impact. As the impact pressure decreases, the thermostat coil, acting as a spring, will turn the valve in the opposite direction for reopening of the ports.

The magnitude of the fluid impact may be modified by the proper contour and dimensioning of the vane surfaces on the valve and constructing the thermostat helix with a proper spring constant, and with the proper dimensioning and proportioning any desired rate of change of shock absorber resistance with piston speed can be obtained as well as the desired freedom of change of shock absorber resistance with temperature. The valve structure is preferably primarily manually adjusted and set to give approximately the same shock absorber resistance as the number of oscillations per minute corresponding with the frequency of the vehicle springs with which the shock absorbers are to be used. With the valve arrangement shown it is evident that the resistance of a shock absorber will increase fast enough as its speed of movement increases to properly dampen the vehicle springs at both large and small deflections of the spring. The action of the shock absorber will be such that its resistance will be more nearly proportionate to severity of road conditions, and such resistance is built up steadily from a boulevard ride to a high speed ride over rough roads, there being no sudden breaks or discontinuances in the action of the shock absorber, but the resistance will at all times be proportional to the speed of operation.

The valve plug 47 and its seating passageway 48 are finished so that the valve plug will have an easy though leakproof fit in the passageway, and the fit of the collar 55 in the bore 44 and the fit of the outer end of the valve stem in the supporting head 53 are such that the valve plug will be centered and properly aligned in its seat 48 but with the least resistance so that the valve structure may be rotated freely and accurately by the thermostat element and by the fluid impact for accurate automatic adjustment of the shock absorber.

The valve plug, the supporting head 53 and the thermostat element secured at its ends to the valve plug and support, form a unitary structure which can be readily inserted into or removed from the shock absorber. After insertion into the shock absorber the valve plug is primarily set manually by turning of the head 53 and then the lock nut 59 is applied to lock the valve structure in set position and then the closure plug 60 is secured.

I have shown a practical and efficient embodiment of the various features of my invention but I do not desire to be limited to the exact construction, arrangement, and operation shown and described as changes and modifications may be made without departing from the scope and spirit of the invention as defined in the appended claims.

I claim as follows:

1. A hydraulic shock absorber comprising a housing enclosing a space for containing fluid, a piston structure within said housing, means affording a bypass for flow of fluid from one side of the piston to the other during relative movement of said piston structure and housing, a rotary valve for said bypass, yielding means tending to hold said valve in open position, and means controlled by the impact of said fluid causing rotary movement of said valve toward bypass closing position in proportion to the velocity of fluid flow through said bypass.

2. A shock absorber comprising a housing for containing resistance fluid, a piston structure operable within said housing to displace the fluid, means affording a bypassage for flow of fluid from one side of the piston structure to the other during relative movement between said housing and piston structure, a rotary valve interposed in said bypassage adapted to respond to the impact of the fluid flowing through said bypassage to move in a direction toward closing said bypassage, and thermostat means for rotating said valve to adjust said bypassage in accordance with change in temperature of the fluid.

3. A shock absorber comprising a housing for containing resistance fluid, a piston structure operable within said housing to displace the fluid, means affording a bypassage for flow of fluid from one side of the piston structure to the other during relative movement between said housing and piston structure, a valve interposed in said bypassage adapted to respond to the impact of the fluid flowing through said bypassage to move in a direction toward closing said bypassage, and thermostat means for moving said valve to adjust said bypassage in accordance with change in temperature of the fluid, said thermostat means functioning as a spring to resist impact movement of said valve.

4. A shock absorber comprising a housing having a space for containing resistance fluid, a piston structure within said housing dividing said space into high and low pressure chambers, means affording a bypassage for flow of fluid from one side of the piston structure to the other during relative movement between said housing and piston structure, a rotary valve interposed in said bypassage and having a vane surface exposed to the flow of fluid from the high pressure chamber to the low pressure chamber for impact of the fluid against said vane surface to cause rotary movement of said valve toward closing position relative to said bypassage, and yielding means resisting such impact movement of the valve, said yielding means cooperating with the impact pressure to control closing movement of the valve in proportion to increasing velocity of the fluid flow through said bypassage.

5. A shock absorber comprising a housing having a space for containing resistance fluid, a piston structure within said housing dividing said space into high and low pressure chambers, means affording bypassage for flow of fluid from one side of the piston structure to the other during relative movement between said housing and piston structure, a rotary valve interposed in said bypassage, means whereby the fluid pressure against said valve will tend to move it toward closing position, and a thermostat element connected with said valve for automatically setting said valve in accordance with the change in viscosity of the fluid under temperature variation, said thermostat element acting as a spring to resist movement of said valve by the fluid pressure.

6. A shock absorber comprising a housing having a space for containing resistance fluid, a piston structure within said housing dividing said space into high and low pressure chambers, means affording bypassageway for flow of fluid from one side of the piston to the other during relative movement between said housing and piston structure, a rotary valve interposed in said passageway, yielding means tending to hold said valve in open position, and means whereby the impact of the fluid flowing through said bypassageway will cause rotation of said valve to more or less close said passageway in proportion to the velocity of the fluid flowing through said passageway.

7. In a hydraulic shock absorber comprising a housing having a space for containing resistance fluid, a piston structure operable within said housing against the resistance flow of said fluid, a bypass from one side of the piston structure to the other, and a rotary valve structure operable automatically to adjust said bypass in accordance with temperature changes and to increase the flow resistance through said bypass proportionately to the increase of the velocity of the fluid through said bypass.

8. A hydraulic shock absorber comprising a housing for containing resistance fluid, a piston structure within said housing operable against the flow resistance of said fluid, a bypass from one side of the piston structure to the other, a rotary valve interposed in said bypass and having a vane surface against which fluid flowing through said bypass may impinge to cause rotation of said valve for adjustment of said bypass, and a thermostat element serving the dual purpose of setting said valve in accordance with temperature variations and of resisting impact rotation of said valve.

9. A hydraulic shock absorber comprising a housing for containing resistance fluid, a piston structure within said housing operable against the flow resistance of said fluid, a bypass from one side of the piston structure to the other, a rotary valve interposed in said bypass, spring means resisting movement of said valve, and said valve having a vane surface against which fluid flowing through said bypass may impinge to cause rotation of said valve for adjustment of said bypass.

10. A hydraulic shock absorber comprising a housing enclosing a space for containing fluid, a piston structure within said housing, means affording a bypass for flow of fluid from one side of the piston to the other during relative movement of said piston structure and housing, a rotary valve for said bypass, yielding means tending to hold said valve in open position, and means controlled by the impact of said fluid causing rotation of said valve toward bypass closing position in proportion to the velocity of fluid flow through said bypass.

11. The combination with a hydraulic shock absorber having a bypassage for the discharge of fluid under pressure, of a regulating valve structure for controlling the discharge of fluid through said bypassage, said valve structure including an adjustable head at one end, a rotary valve at its opposite end, and a stem extending from said valve and journalled in said head.

12. The combination with a hydraulic shock absorber having a bypassage for the discharge of fluid under pressure, of a regulating valve structure for controlling the discharge of fluid through said bypassage, said valve structure including an adjustable head at one end, a rotary valve at its opposite end interposed in said bypassage, a stem connected at one end with said valve and at its other end being journalled in said head, and a thermostat element connected with said head and valve.

13. The combination with a hydraulic shock absorber having a bypassage for the discharge of fluid under pressure, of a regulating valve structure for controlling the discharge of fluid through said bypassage, said valve structure including an adjustable head, a rotary valve interposed in said bypassage, a stem connected at one end with said valve and at its other end being journalled in said head, and a thermostat element in the form of a helix embracing said stem and secured to said head and valve.

14. The combination with a hydraulic shock absorber having a passage for the discharge of fluid under pressure, of a regulating valve structure for controlling the discharge of fluid through said passage, said valve structure including an adjustable supporting head, a rotary valve plug interposed in said passage, a temperature responsive element in the form of a helix securd at its ends to said head and plug respectively, and a stem extending from said valve plug through said temperature responsive element and journaled in said head.

15. In combination, a hydraulic shock absorber, and a thermostat therefor including a longitudinally wound bimetal coil in which the two metals have different coefficients of expansion, a rotary valve at one end of said coil to vary the effective area of the opening of the shock absorber thru which the cushioning liquid is passed, and fastened to said coil at the opposite end thereof a manually adjustable screw engaging with a wall of said shock absorber.

16. In combination, a hydraulic shock absorber having formed therein a chamber provided at one end with a valve seat and at its opposite end with internal screw threads, a rotary valve in said seat, an adjusting screw engaging with the screw threads, and a thermostat comprising a coiled strip of two metals of different coefficients of expansion, said strip at one end being fastened to said adjusting screw and at its opposite end being fastened to said valve whereby as said strip expands and contracts due to temperature changes said valve is rotated in relation to its seat to regulate the flow of the cushioning liquid.

17. In a hydraulic shock absorber comprising a housing having a space for containing resistance fluid, a piston structure operable within said housing against the resistant flow of said fluid, a bypass providing for the escape of fluid from one side of the piston structure to the other, a rotary valve in said bypass for restricting the flow of fluid therethrough, a manually operable adjusting head, and a bimetallic member providing an operative connection between said adjusting head and valve for rotating said valve in response to rotation of said head and also for rotating said valve in response to and in acordance with temperature changes independently of the movement of said head.

18. In a hydraulic shock absorber comprising a housing having a space for containing resistance fluid, a piston structure operable within said housing against the resistant flow of said fluid, a bypass from one side of the piston structure to the other, a rotary valve in said bypass for restricting the flow of fluid therethrough, a manually operable setting member, and a bimetallic member providing an operative connection between said setting member and valve for rotating said valve in response to operation of said setting member and also for rotating said valve in response to and in accordance with temperature changes independently of the operation of said setting member.

19. A hydraulic shock absorber comprising a housing having a space for containing resistance fluid, a piston structure operable within said housing against the resistant flow of said fluid, a bypass from one side of the piston structure to the other, a rotary valve in said bypass for restricting the flow of fluid therethrough, a rotatable setting head coaxial with said valve, and a bimetal member providing an operative connection between said head and valve for rotating said valve for setting thereof in response to rotation of said head and also for rotating said valve in response to and in accordance with temperature changes after setting of said valve and independently of said head.

20. A hydraulic shock absorber comprising a housing forming a chamber for containing resistance fluid, a piston structure operable within said chamber against the flow of resistance of said fluid, a valve seat element having a cylindrical passage, a port extending from one end of said passage and connecting with said chamber at one side of said piston, a second port having communication with the other end of said passage and connecting with said chamber at the other side of said piston, said ports and passage forming a bypass for flow of fluid from one side of the piston to the other, a cylindrical valve rotatable in said cylindrical passage and having a metering channel, said channel at one end being at all times in full communication with said second port and at its other end extending transversely of said first mentioned port, and thermostatic means connected to rotate said valve for varying the overlap of said first mentioned port by said metering channel to thereby adust for the flow of fluid through said bypassage in accordance with changes in temperature of the fluid.

21. The combination with an hydraulic shock absorber having a passage for the flow of fluid under generated hydraulic pressure, of a rotary valve for said passage, yielding means tending to hold said valve in open position, and means for subjecting said valve to the generated pressure for rotation thereof to restrict the flow.

22. In a hydraulic shock absorber, a housing for hydraulic fluid, a piston structure and a partitioning element dividing said housing into working chambers, passage means connecting said chambers, pressure controlled rotary valve means controlling said passage means, yielding means tending to hold said valve in open position, and means to apply generated pressure to rotate said valve for restricting said passage.

23. The combination with a hydraulic shock absorber having a passage for the flow of fluid under generated pressure, of a rotary valve for said passage, spring means resisting movement of said valve, and means for subjecting said valve to the generated pressure for rotation thereof to control the flow through said passage.

24. In a hydraulic shock absorber, a housing for hydraulic fluid, a piston structure operable in said housing to displace the fluid therein, means providing a passage for the flow of fluid from one side of the piston structure to the other, said passage including a valve seat, a rotary valve journalled in said seat for controlling the flow through said passage, said valve having a vane surface exposed to said passage for impingement thereagainst of fluid under pressure and rotation thereby of said valve for control of said passage.

25. In a hydraulic shock absorber, a housing for hydraulic fluid, a piston structure operable in said housing to displace the fluid therein, means providing a passage for the flow of displaced fluid from one side of the piston structure to the other, said passage including a valve seat, a rotary valve journalled in said seat for controlling the flow through said passage, said valve having vane surfaces associated therewith and exposed for impingement thereagainst of fluid flowing through said passage whereby said valve will be automatically adjusted by the fluid pressure.

26. In a hydraulic shock absorber, a housing for hydraulic fluid, a piston structure operable in said housing to displace the fluid, means providing a passage for the flow of the displaced fluid, a ported rotary valve for controlling the flow through said passage, said valve having vane surfaces for impingement thereagainst of the fluid under pressure and rotation thereby of said valve for control of said passage.

27. In a hydraulic shock absorber, a housing for hydraulic fluid, a piston structure operable in said housing to displace the fluid therein, means providing a passage for the flow of the displaced fluid from one side of the piston structure to the other, said passage including a valve seat, a rotary valve journalled in said seat and having a port for cooperating with said passage to control the flow of fluid therethrough, said port presenting a vane surface for impingement thereagainst of fluid flowing through said passage and rotation of said valve by said impingement in a direction for restriction by its port of said passage.

RALPH F. PEO.